Jan. 1, 1929.

P. ASMUSSEN 1,697,628

POWER TRANSMISSION MECHANISM

Filed Feb. 23, 1928

Inventor

*Peter Asmussen*

By *Reynolds & Reynolds*

Attorneys

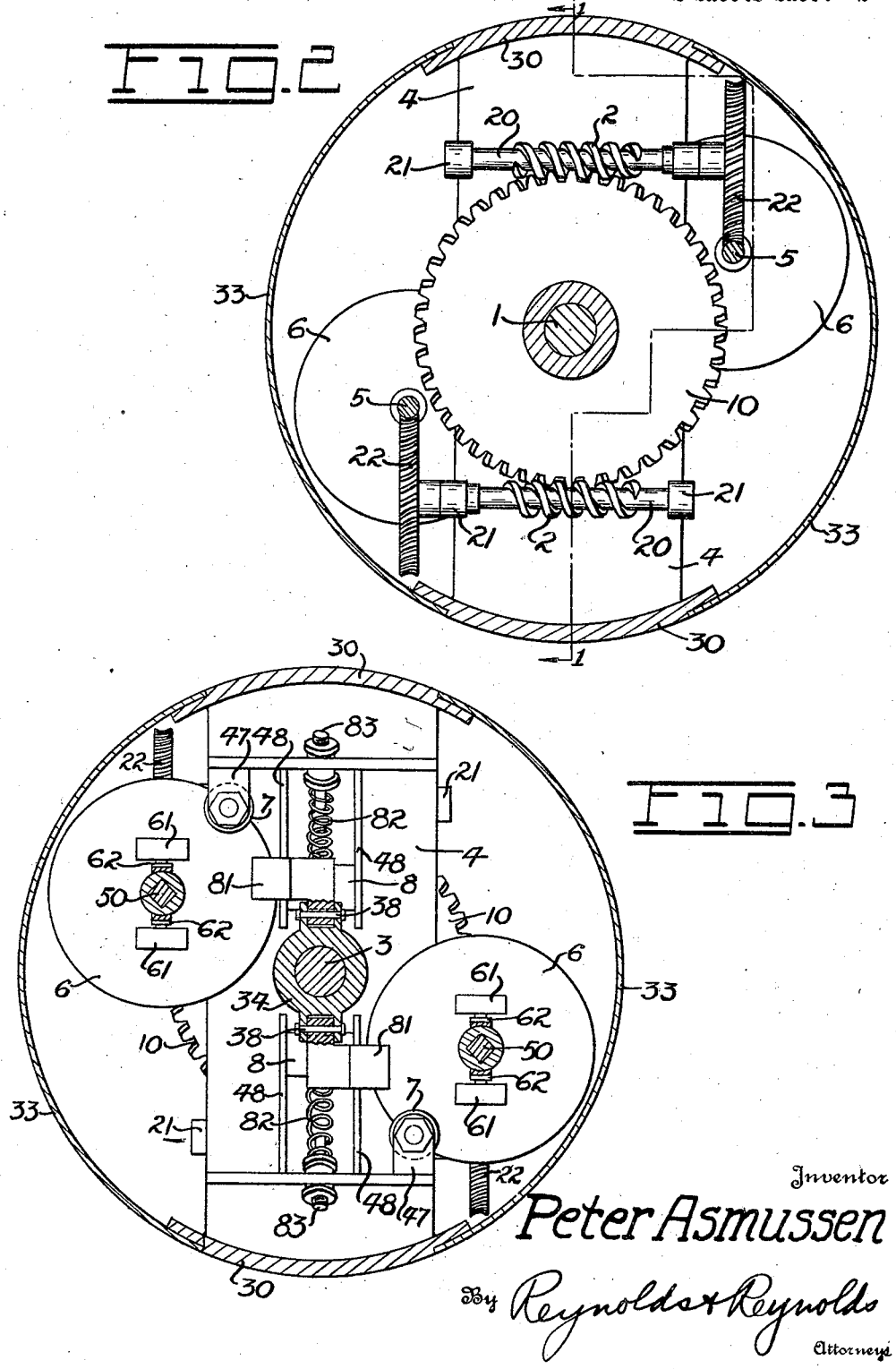

Patented Jan. 1, 1929.

1,697,628

UNITED STATES PATENT OFFICE.

PETER ASMUSSEN, OF SEATTLE, WASHINGTON.

POWER-TRANSMISSION MECHANISM.

Application filed February 23, 1928. Serial No. 256,201.

My invention relates to power transmission mechanism, and more especially to devices intended for interposition between the clutch and the driven element in a power transmission line, whereby the prime mover may be relieved of any excess load, tending to slow it down to the point where there is danger of stalling it, and whereby a load may be automatically picked up again as the prime mover gains in speed.

It is a primary object of my invention to provide means intended to be interposed between the prime mover and the driven object, whereby, as excess loads are placed on the driven member, tending to slow down or stop the prime mover, the connection between the two is interrupted, but is automatically resumed again when the prime mover has gained additional speed, thus placing it in position to overcome the retardation of the excess load or resistance.

While my device will be found useful in conjunction with electrically driven power lines, as a means of avoiding the frequent operation of an overload relay when the motor is subjected to excess loads, it is my principal object, specifically, to employ such transmission means between the internal combustion engine of an automobile and the drive wheels, whereby, if the engine commences to labor, as the vehicle is driven up a steep hill, or by reason of an excess load, the engine will be automatically relieved of the load and will be permitted to speed up and then again connected to the drive wheels, this increase in speed tending to overcome the dragging effect on the motor of the vehicle or load.

Stated otherwise, it is my object to provide automatic means, preferably governor controlled, and interposed between the driving and driven shafts; these automatic means being divided into two elements, one controlled by the engine speed and the other controlled by the vehicle speed as related to the engine speed, whereby at speeds below a minimum vehicle speed, corresponding to an engine speed so low that there may be danger of stalling, the connection between the engine and the drive wheels will be broken, and whereby connection is made frictionally, yet not positively between the engine and the driving wheels, this increasing at all speeds up to the point where the first-named means becomes operative.

It is a further object to provide means which are simple, inexpensive, reliable, easily adjustable and thoroughly automatic, and one which normally requires no expenditure of power, for the accomplishment of the ends outlined above.

My invention comprises the novel parts and the novel combination and arrangement thereof as shown in the accompanying drawings, described in the specification, and particularly defined by the claims terminating the same.

In the accompanying drawings I have shown my invention in a form which is now preferred by me.

Figure 2 is a transverse section on the line 2—2 of Figure 1.

Figure 3 is a transverse section on the line 3—3 of Figure 1.

Figure 1:
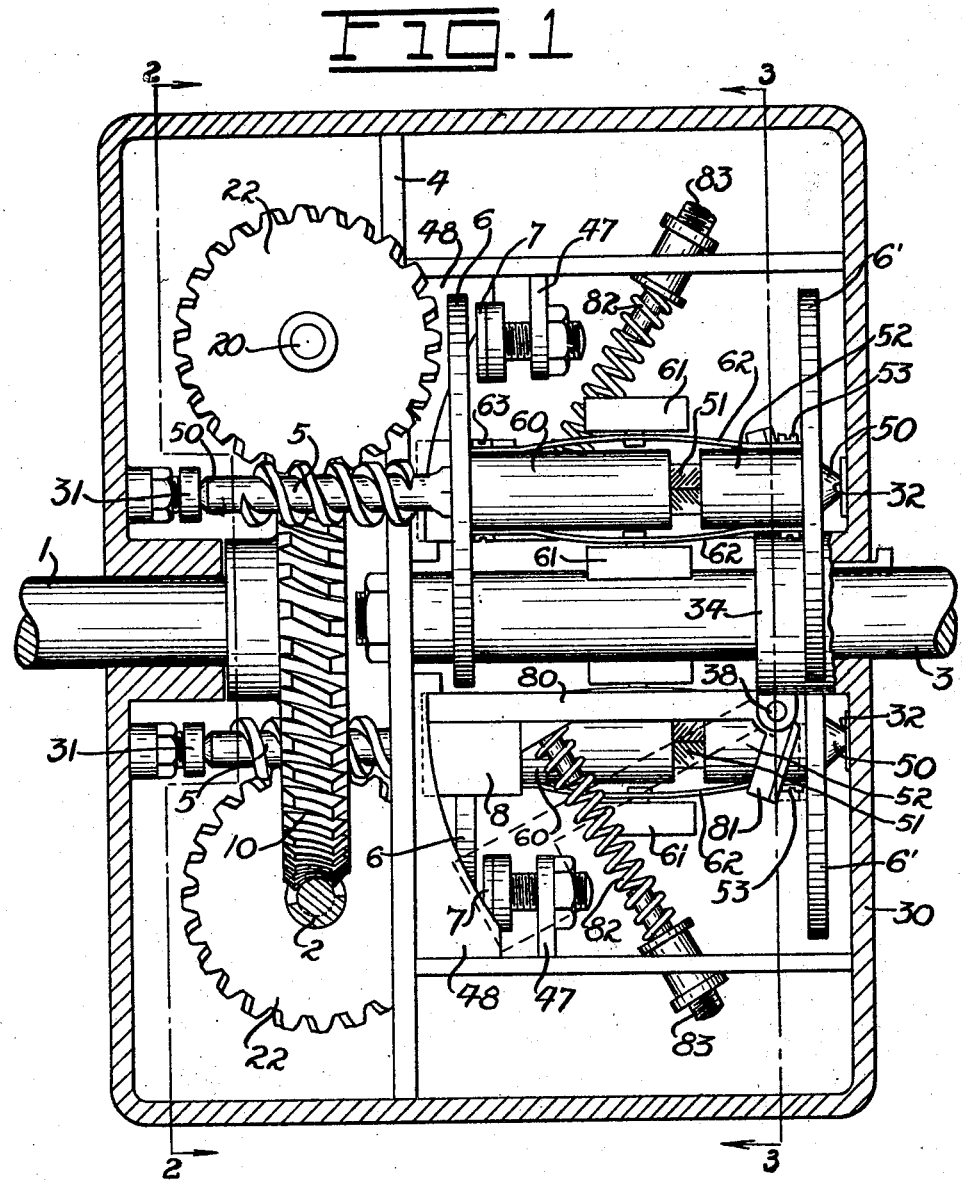
Figure 1 is in general an axial section, through my device, taken substantially on the line 1—1, of Figure 2.

While I have not illustrated the gasoline or other internal combustion engine, the ordinary transmission or the clutch, all of which are intended to be employed, nor have I shown the vehicle drive means, such as the differential, rear axle and the like, which form part of the usual motor vehicle, it may be understood that these are all to be employed, and that the mechanism which I will proceed to describe is an additional element intended to be inserted between the ordinary transmission and the rear wheels, ordinarily between the transmission and the differential. Thus the shaft 1 may be taken as the shaft extending rearwardly from the transmission case, and for convenience will be designated as the drive shaft, and the shaft 3, which extends to the differential, may be designated the driven shaft.

Secured upon the drive shaft 1 is a gear 10, which meshes with gear 2 on transverse shaft 20; for compactness these gears 10 and 2 may be spiral gears, but must be such that the gear 10 will drive the gear 2 more rapidly than the gear 10. In other words there is a speeding up of the shafts 20, of which two are preferably provided to achieve proper balance. These shafts 20 are suitably journaled at 21, which journals are carried in a frame 4, the support for which and the connections to which will be described hereinafter. The shafts 20 each carry gears 22, preferably at opposite ends, as will be seen in Figure 2, which gears 22 mesh with gears 5 upon longitudinally extending shafts 50. As in the case of the gears 10 and 2, the gears 22 and 5 may be spiral gears, thus affording compactness, while speeding up the shaft 50 over the speed of the shaft 20. Any other suitable form of gearing may be employed, however, between the shafts 1 and 50.

The shafts 50 are journaled at 31 and 32 in bearings formed in a housing 30, which housing supports the frame 4 and is keyed or otherwise secured to the driven shaft 3. Removable plates 33 (see Figures 2 and 3), may be employed to form part of the housing 30 and to permit access to the mechanism contained therein, for adjustment, inspection or replacement of parts. By this arrangement it will be understood that the various gears 22, 5 and 2, and the mechanism pertaining thereto, will all be revolved bodily with the housing 30, which supports their shafts, this revolution being about the axis of the driven shaft 3, which, however, is shown in this embodiment as in alignment with the axis of the driving shaft 1. Also, each of these gears and their shafts will, at times, have its own rotation upon its own axis, independently of its bodily revolution around the axis of the shafts 1 and 3.

Each of the shafts 50 is continuous from its bearing 31 to its bearing 32 at the opposite end of the housing. However, each is provided with a squared portion 51 on which is slidable a sleeve 60, carrying a disk 6. There is also secured to each shaft 50 a collar 52 and a disk 6' formed thereon and rotating therewith. As will be apparent, hereafter, the disk 6' might be omitted and the disk 6 only made use of, but preferably I employ both of these disks, which are in effect the rotative part of a clutch, therefore, when I refer in the claims to the rotative member of the clutch element I may mean either or both of the disks 6 and 6', as the context may indicate.

The disk 6 and its sleeve 60 are freely slidable longitudinally of the squared portion 51 of the shaft 50, and this movement is controlled by means forming, in effect a centrifugal governor, and consisting of the weights 61 supported on spring straps 62 extending from a connection at 53 to the collar 52, and at 63 to the sleeve 60. Rotation of the shaft 50, which is driven from the engine, at high speed, will cause a tendency for the disk 6 to approach the disk 6', and this tendency may be controlled, and the independent rotation of all parts driving the disk 6 may be slowed down, by providing a fixed clutch element 7 complemental thereto, and which is frictionally engaged therewith.

Such a clutch element is shown as comprising a shoe, frictionally engageable with the disk 6, and supported in a bracket 47 in the frame 4, in such a manner that its position with respect to the normal position of the disk 6 may be adjusted. When engaged with the disk 6, it will tend to slow down the same, and this tendency will react through the various drive connections to this disk, tending to slow them down. It will not, of course, stop the rotation of the gear 10, which is secured upon the main drive shaft 1, inasmuch as the reaction is through the housing 30, which is free to revolve with the driven shaft 3, but no great effort is required to slow down the disk 6, revolving at so high a speed as compared to the driving shaft 1, and this will have the effect of clutching the frame 4 and housing 30, which supports this, to the driving shaft 1. Thus, for a speed of the motor shaft 1 in excess of the speed of the driven shaft 3, the shaft 50 and its drive connections will have independent rotation on their own axes, and there will be a clutching tendency developed between the elements 6 and 7, which will tend to equalize the speed of the shafts 1 and 3. This effect is produced following release of the normal driving connection, to be described, between these shafts, and a subsequent speeding up of the engine.

The connection between the clutch elements 6 and 7 is not a positive one, as has been explained heretofore, but a frictional one which permits slipping. However, it is desired to provide a positive connection between these two shafts 1 and 3 for the higher vehicle speeds. Inasmuch as the connection described heretofore between the elements 6 and 7 rotates the housing 30, and thereby causes a centrifugal effect upon all of the devices contained therein, I propose to take advantage of this in the formation of a positive clutch between the two shafts 1 and 3, so that at all vehicle speeds above a predetermined minimum (for example the lowest speed at which the vehicle will travel in high gear), there will be a direct and positive connection between the driving shaft 1 and the driven shaft 3.

Thus, I provide a weight 8 supported at the end of the longer arm 80 of a bell crank lever, this lever being pivoted at 38 upon a collar 34, secured upon the driven shaft 3. The second arm 81 of the lever carries a shoe which is engageable with the clutch disk 6'.

Upon attaining a given speed of rotation the shaft 3 will exert such a centrifugal effect upon the weight 8 that it will be thrown outward to a position indicated in dotted lines in Figure 1, in opposition to the force of a compression spring 82, the force of which is adjustable, as indicated at 83. The weight 8 is suitably guided, as by guide walls 48 supported by the frame 4.

Now, as the housing 30 gains speed through the engagement between the clutch elements 6 and 7, the centrifugal force will, in time (corresponding to a selected minimum speed of the vehicle), cause the weight 8 to move outward until the shoe 81 is firmly pressed against the clutch disk 6', which it will be remembered, has its independent rotation from the engine, with the clutch disk 6. This centrifugal effect will eventually be sufficient that rotation of the disk 6' will be stopped. The effect of this is simply to positively clutch the shafts 1 and 3 together, so that they rotate at the same speed, and the clutching effect between the shoe 81 and the disk 6' will continue so long as the shafts 1 and 3 are rotating substantially at such speed as does not fall below that corresponding to the lowest speed at which the vehicle will travel in high gear.

When the speed of the vehicle drops below this selected speed, which of course can be determined by adjustment of the compression of the springs 82, the engagement of the shoes 81 will be released, and the weights 8 will fall back toward their full line position of Fig. 1. This permits rotation of the disk 6', and of course of the disk 6, the rotation of which had been stopped when rotation of the disk 6' was stopped and this renewed rotation of the disk 6 and gearing connected thereto will permit speeding up of the shaft 1, until its speed has risen to a point where the elements 6 and 7 again clutch with sufficient effect to produce rotation of the housing 30, to an extent to re-engage the shoe 81 with the disk 6'.

Thus it will be seen that the action is automatic. As the speed of the vehicle slows down to a point where it would tend to kill the engine, were they directly connected, there will be a release of the clutch elements 81 and 6', but this will immediately be followed by a speeding up of the engine and clutching of the elements 6 and 7, this resulting eventually in a speeding up of the vehicle to an extent sufficient to re-engage the positive clutch elements 81 and 6', then causing a release of the clutch elements 6 and 7, by reason of their losing their independent rotation. These actions, occurring automatically, make it unnecessary for the driver to release his clutch and slip it, or to shift gears, so long as there can be any tendency to drive between the clutch elements 6 and 7. The action is, in effect, a slipping of the clutch to permit the engine to speed up, and a re-engagement automatically after the engine has speeded up.

During all normal operation of the vehicle there are no moving parts in my transmission, and all parts revolve bodily with the housing 30, but without independent rotation. It follows that there can be no loss of power, as in the ordinary gear transmission.

Let it be assumed that the vehicle is going up a steep hill, and slows down to an extent which would stall the engine, were the direct connection at 81 and 6' between the engine and the drive wheels to be continued, the vehicle's loss of speed reacts by loss of speed of rotation in the housing 30 to release the clutch member 81, which is directly under the control of the centrifugal governor 8, responsive to the vehicle's speed. Immediately, because there is now no connection between the engine and the drive wheels, and the housing 30 has slowed down, the engine begins to race, and the shafts 50 and their drive connections speed up. This reacts through the governors 61 to throw into engagement the clutch elements 6 and 7, tending then to rotate the housing 30. As these elements will be so constructed and adjusted that they will always slip to a certain extent, the clutching effect will never be so great as to tend to stall the engine. It may be increased, when desired, by feeding more fuel to the engine, speeding it up, but at high engine speeds there is no danger of stalling, hence the greater clutching effect thus produced merely applies to the driven shaft as much power as it can absorb, and the effect is similar to that obtained by shifting to a lower gear, yet the entire control lies in the throttle.

What I claim as my invention is:

1. In combination with a driving and a driven shaft, an automatic transmission element therebetween comprising a housing secured to the driven shaft to revolve therewith; a rotative clutch member supported within said housing to revolve bodily therewith and to have independent rotation upon its own axis, drive means connecting the driving shaft with said rotative member, a governor likewise driven from said driving shaft, said governor being adapted to control said rotative clutch member for frictionally clutching the same to the housing at engine speeds above a predetermined minimum.

2. An automatic transmission element as in claim 1, a second rotative member supported within the housing and driven from the driving shaft, a second governor driven from the driven shaft, and a clutch member controlled by said second governor, and engageable with said second rotative member at vehicle speeds above a predetermined minimum.

3. In combination with a driving and a driven shaft, an automatic transmission element interposed therebetween comprising a revoluble housing, operatively connected to rotate with the driven shaft, a governor therein operatively connected to be driven from the driving shaft, a clutch element operatively connected to said housing, a second governor in said housing operatively connected to be driven from the driven shaft, a second clutch member connected to said second governor, and shiftable means journaled within said casing and operatively connected to be driven from said first governor to engage the first clutch element at engine speeds above a predetermined minimum, and to be engaged by the second clutch element at vehicle speeds above a predetermined minimum.

4. In combination with a driving and a driven shaft, an automatic transmission element therebetween including a housing secured to and revoluble with the driven shaft, a rotative clutch member journaled in said housing to revolve therewith, and to rotate independently thereof on its own axis drive means connecting the driving shaft with said rotative clutch member, complemental means, one associated with said housing, and one operable by rotation of said rotative clutch member to interengage and cause rotation of the housing and driven shaft, a governor driven from the driven shaft, and a clutch member controlled by said governor to release said rotative clutch member at vehicle speeds below a predetermined minimum.

5. The combination with a driving shaft and a driven shaft, of two clutch elements, two governors, one driven from the driving shaft and the other driven from the driven shaft, and clutch means engageable with said two clutch elements, an operable connection between said clutch means and the driving shaft, said governors controlling engagement between the clutch means and the respective clutch elements.

6. The combination with a driving shaft and a driven shaft, of two clutch elements, two governors, one driven from the driving shaft and the other driven from the driven shaft, clutch means engageable selectively with one or the other of said two clutch elements, said clutch means being operably connected with said drive shaft, said governors being selectively operable to control engagement between the clutch means and the respective clutch elements in accordance with the engine and vehicle speeds, respectively.

7. In combination with a driving shaft and a driven shaft, a rotatable housing, a disk journaled therein, drive means between the driving shaft and said disk, a contact shoe supported in said housing, a governor, and means initiated by rotation of the driving shaft for rotating the governor, and means operable from said governor for bringing said shoe and disk into contact to clutch together the driving shaft and said housing, the housing being rotatable with the driven shaft.

8. In combination with a driving shaft and a driven shaft, a rotatable housing, a disk journaled therein, a contact shoe supported in said housing, drive means connecting said driving shaft with the disk to rotate the latter, a governor likewise driven from the driving shaft, and means operable from said governor for bringing said shoe and disk into contact to clutch together the driving shaft and the housing, said housing being rotatable with the driven shaft.

9. In combination with a driving shaft and a driven shaft, a housing rotatable with the driven shaft, a disk journaled therein, drive means connecting said driving shaft and the disk, a contact shoe supported in said housing, a centrifugal governor mounted in and operable upon rotation of said housing, means operable from said governor for bringing said shoe and disk together to connect the driving shaft and driven shaft through the housing rotatable with the latter, and means operable from the driving shaft for initiating rotation of said housing.

10. In combination with a driving shaft and a driven shaft, a housing rotatable with the driven shaft, two centrifugal governors mounted therein, one connected to the driving shaft to be driven therefrom, and the other driven from the housing itself, two pairs of clutch elements interposed between the driving shaft and the housing rotatable with the driven shaft, means controlled by the first governor to bring the first pair of clutch elements into engagement to initiate rotation of the housing, and means controlled by the second governor to engage the second pair of clutch elements to positively connect the two shafts, upon the attainment of a selected minimum speed of rotation by the housing under the influence of the first clutch.

11. A transmission element as in claim 10, the two clutches having a member of one rotatable with the corresponding member of the other, and connected to the first governor, whereby engagement of the second clutch pair stops the rotation of the first governor and releases the first clutch, controlled thereby.

12. A transmission element as in claim 10, including means for regulating the maximum engagement of each governor to occur at a selected speed of its driving member.

13. In combination with a driving and a driven shaft, an automatic transmission element interposed therebetween, comprising a revoluble housing secured to the driven shaft to revolve therewith, two rotative clutch members revoluble with the housing and rotatable about an axis independent of the housing, in which they are journaled, operable connection between said rotative clutch members and the driving shaft, two clutch elements, one of which is fixed in said housing, the other pivotally secured in said housing, two governors, one of which is driven from the driving shaft and adapted to engage one of said clutch members with said fixed clutch element, the other governor being driven from the driven shaft and fixedly connected to said pivoted clutch element to engage the other clutch member, the governor controlled by the driving shaft being adapted through its clutch member and element to control engagement between the driving and driven shaft at engine speeds above a predetermined minimum, the other governor being driven from the driven shaft through its clutch element and member to break engagement between the shafts at vehicle speeds below a predetermined minimum.

Signed at Seattle, King County, Washington, this 15th day of February, 1928.

PETER ASMUSSEN.